United States Patent
Ogino et al.

(10) Patent No.: US 11,936,963 B2
(45) Date of Patent: Mar. 19, 2024

(54) IMAGING DEVICE

(71) Applicant: NEC Corporation, Tokyo (JP)

(72) Inventors: Yuka Ogino, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/767,975

(22) PCT Filed: Nov. 5, 2019

(86) PCT No.: PCT/JP2019/043285
§ 371 (c)(1),
(2) Date: Apr. 11, 2022

(87) PCT Pub. No.: WO2021/090366
PCT Pub. Date: May 14, 2021

(65) Prior Publication Data
US 2023/0188814 A1    Jun. 15, 2023

(51) Int. Cl.
*H04N 23/11* (2023.01)
*G02B 5/08* (2006.01)
*G03B 17/18* (2021.01)
*G06V 40/18* (2022.01)
(Continued)

(52) U.S. Cl.
CPC ......... *H04N 23/11* (2023.01); *G02B 5/0808* (2013.01); *G03B 17/18* (2013.01); *G06V 40/197* (2022.01); *H04N 23/51* (2023.01); *H04N 23/611* (2023.01)

(58) Field of Classification Search
CPC ........ G06V 40/70; G06V 40/19; G06V 40/16; G06V 10/147; G06V 40/197; H04N 23/11; H04N 23/51; H04N 23/611; G02B 5/0808; G03B 17/18
See application file for complete search history.

(56) References Cited

U.S. PATENT DOCUMENTS 11,619,771 B2 * 4/2023 Sharma .................. G02B 5/26
                                                     359/350
2002/0191075 A1 12/2002 Doi et al.
(Continued)

FOREIGN PATENT DOCUMENTS

CN     106295536 A     1/2017
JP     2002-122899 A   4/2002
(Continued)

OTHER PUBLICATIONS

International Search Report for PCT Application No. PCT/JP2019/043285, dated Feb. 4, 2020.
(Continued)

*Primary Examiner* — Amy R Hsu

(57) ABSTRACT

An imaging device according to this disclosure includes: a visible light camera that captures an image of a face of a person to be authenticated; a plurality of infrared light cameras that is provided on a housing with the visible light camera and captures an image of an iris of the person to be authenticated; and an optical filter that is provided on the housing so as to cover a light receiving surface of each of the plurality of infrared light cameras and not to cover a light receiving surface of the visible light camera, and has a pass band in an infrared region and a blocking band in a visible region.

18 Claims, 24 Drawing Sheets

(51) Int. Cl.
*H04N 23/51* (2023.01)
*H04N 23/611* (2023.01)

(56) References Cited

U.S. PATENT DOCUMENTS

| | | | |
|---|---|---|---|
| 2004/0252988 A1* | 12/2004 | Imaoka | G06V 40/19 |
| | | | 396/18 |
| 2010/0128937 A1* | 5/2010 | Yoo | G06V 40/70 |
| | | | 348/78 |
| 2015/0347843 A1* | 12/2015 | Min | G06F 18/00 |
| | | | 382/117 |
| 2016/0139039 A1* | 5/2016 | Ikehara | H04N 13/254 |
| | | | 348/46 |
| 2017/0243063 A1 | 8/2017 | Kaneko et al. | |
| 2017/0318239 A1* | 11/2017 | Miyasaka | G01J 5/0205 |
| 2017/0323167 A1* | 11/2017 | Mapen | G06T 7/90 |
| 2019/0121005 A1 | 4/2019 | Hasegawa | |
| 2020/0050257 A1* | 2/2020 | Lee | G06F 3/011 |
| 2020/0311238 A1* | 10/2020 | Ackerman | G06F 21/32 |

FOREIGN PATENT DOCUMENTS

| | | |
|---|---|---|
| JP | 2004-086412 A | 3/2004 |
| JP | 2004-167046 A | 6/2004 |
| JP | 2005-242677 A | 9/2005 |
| JP | 2006-163683 A | 6/2006 |
| JP | 2008-310463 A | 12/2008 |
| JP | 2013-132029 A | 7/2013 |
| JP | 2017-151556 A | 8/2017 |
| JP | 2018-109935 A | 7/2018 |
| WO | 2005/024698 A2 | 3/2005 |
| WO | 2009/016846 A1 | 2/2009 |
| WO | 2017/217053 A1 | 12/2017 |

OTHER PUBLICATIONS

Extended European Search Report for EP Application No. 19951954.7 dated on Sep. 14, 2022.

* cited by examiner

IMAGING DEVICE

This application is a National Stage Entry of PCT/JP2019/043285 filed on Nov. 5, 2019, the contents of all of which are incorporated herein by reference, in their entirety.

TECHNICAL FIELD

This disclosure relates to an imaging device used for iris authentication.

BACKGROUND ART

Patent Literature 1 discloses an iris authentication system in which a plurality of iris cameras capable of imaging an iris from a distance are arranged in a vertical direction near a passage route of a person to be authenticated, and an authentication device performs iris authentication of the person to be authenticated using a captured iris image by the iris camera.

CITATION LIST

Patent Literature

PTL 1: International Publication No. 2009/016846

SUMMARY OF INVENTION

Technical Problem

In the iris authentication system exemplified in Patent Literature 1, when a line of sight of the person to be authenticated is directed to a camera other than the iris camera which is arranged at an optimum height for capturing an iris image among the plurality of iris cameras, there is a possibility that an accuracy of iris authentication is deteriorated.

An object of this disclosure is to provide an imaging device capable of improving the accuracy of iris authentication in view of the above-mentioned problems.

Solution to Problem

According to one aspect of this disclosure, there is provided an imaging device including: a visible light camera that captures an image of a face of a person to be authenticated; a plurality of infrared light cameras that is provided on a housing with the visible light camera and captures an image of an iris of the person to be authenticated; and an optical filter that is provided on the housing so as to cover a light receiving surface of each of the plurality of infrared light cameras and not to cover a light receiving surface of the visible light camera, and has a pass band in an infrared region and a blocking band in a visible region.

Advantageous Effects of Invention

According to this disclosure, there are provided an imaging device capable of improving the accuracy of iris authentication.

DESCRIPTION OF EMBODIMENTS

Figure 1:
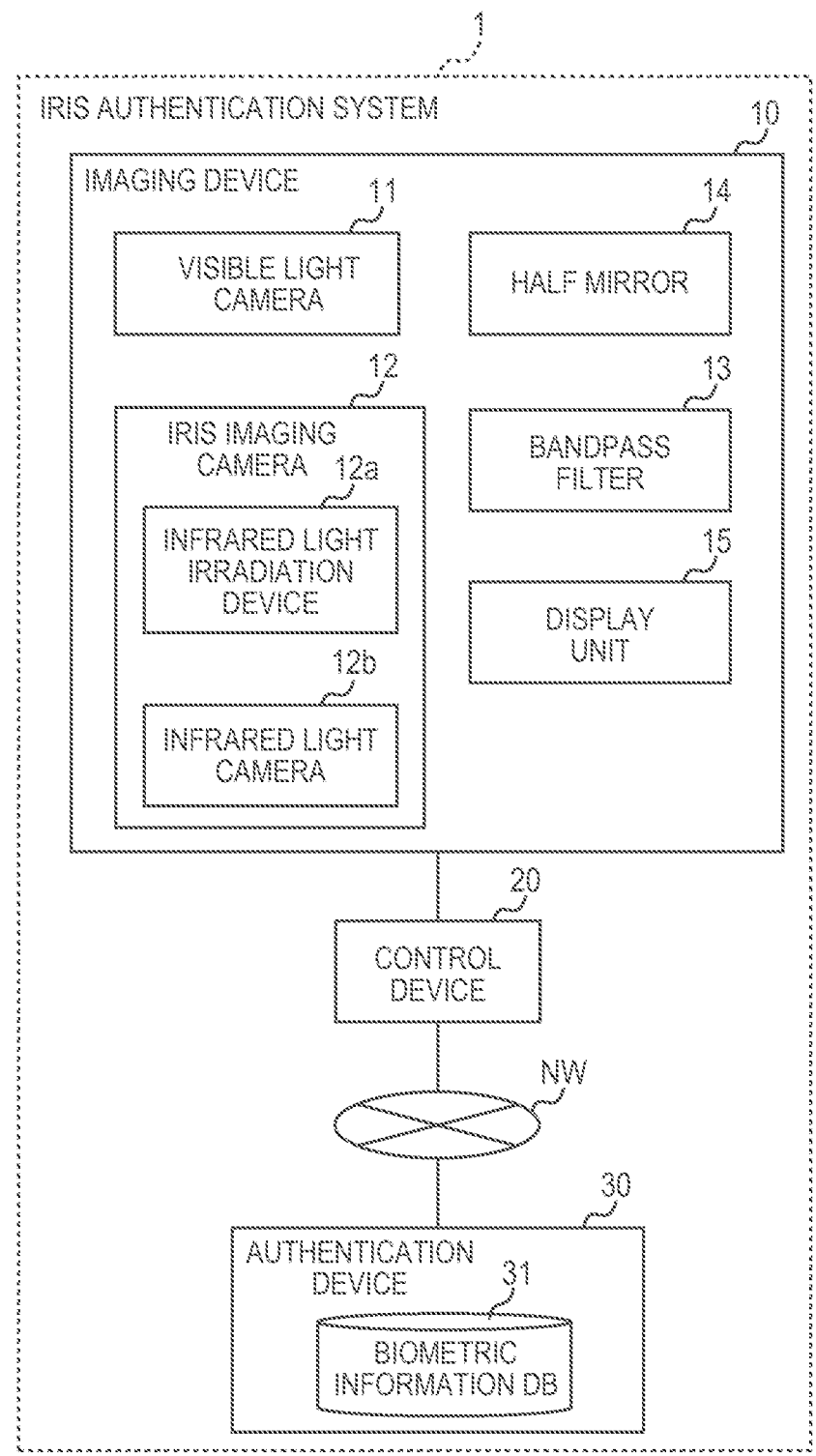
FIG. 1 is a block diagram illustrating an example of the overall configuration of an iris authentication system according to a first example embodiment.

Hereinafter, exemplary embodiments of this disclosure will be described with reference to the drawings. In the drawings, similar or corresponding elements are denoted by the same reference numerals, and the description thereof may be omitted or simplified.

First Example Embodiment

FIG. 1 is a block diagram illustrating an example of the overall configuration of an iris authentication system 1. The iris authentication system 1 captures an image of an iris of a user U who is a person to be authenticated, and performs authentication by matching the captured image against a registered iris image. The pattern of the iris is not equal for all people and is constant throughout life. Therefore, identity verification can be confirmed by performing matching on the pattern of the iris acquired in the authentication process and the iris image registered in advance in the database.

The iris authentication system 1 according to the present example embodiment may be applied, for example, to identity verification for entering and exiting various facilities, identity verification for entering and leaving airports, seaports, and borders, identity verification in administrative agencies, and the like.

As illustrated in FIG. 1, the iris authentication system 1 includes an imaging device 10, a control device 20, and an authentication device 30. Each device is connected to a network NW such as a Local Area Network (LAN) or the Internet.

The imaging device 10 captures an image of a user U existing in the authentication region based on a control information input from the control device 20, and outputs the captured image to the control device 20. The imaging device 10 according to the present example embodiment includes a visible light camera 11, an iris imaging camera 12, a bandpass filter 13, a half mirror 14, and a display unit 15.

The visible light camera 11 is an imaging device that captures an image of a face, eyes, or the like of a user U with visible light. The visible light camera 11 captures an overall image (a first image) including at least a part of the face of the person to be authenticated. As the visible light camera 11, a digital camera using a complementary metal oxide semiconductor (CMOS) image sensor, a charge coupled device (CCD) image sensor, or the like may be used so as to be suitable for image processing in the control device 20. The visible light camera 11 may further include a light source for irradiating the user U with illumination light.

The iris imaging camera 12 is an imaging device including an infrared light irradiation device 12a and an infrared light camera 12b, and captures an image (a second image) of eyes of the user U by infrared light. That is, the imaging device 10 according to the present example embodiment includes two types of cameras that capture images of users U using light in different wavelength ranges.

The infrared light irradiation device 12a includes a light emitting element such as an infrared light LED that emits infrared light. The wavelength of the infrared light irradiated from the infrared light irradiation device 12a may be, for example, in a near-infrared region of about 800 nm.

The infrared light camera 12b includes a light receiving element configured to be sensitive to infrared light. A digital camera using a CMOS image sensor, a CCD image sensor, or the like may be used as the infrared light camera 12b. The infrared light is irradiated from the infrared light irradiation device 12a to the eyes of the user U, and the infrared light reflected by the iris is captured by the infrared light camera 12b, thereby acquiring an image of the eyes including the iris image used for iris authentication. By acquiring an iris image captured by infrared light, a high-contrast image can be obtained irrespective of the color of the iris, and the influence of reflection by the cornea can be reduced.

The bandpass filter 13 is an optical filter having a pass band in the infrared region and a blocking band in the visible region. That is, the bandpass filter 13 is capable of selectively transmitting infrared light of a desired wavelength without transmitting visible light incident from the user U.

The half mirror 14 reflects a part of visible light incident from the user U and transmits another part of visible light. The bandpass filter 13 and the half mirror 14 in the present example embodiment have mirror surfaces that reflect visible light. Thus, the user U can check one's face on the mirror surfaces of the bandpass filter 13 and the half mirror 14.

The display unit 15 is a liquid crystal display, organic light emitting diode (OLED) display, or the like, and displays information related to iris authentication by moving images, still images, characters, or the like. The display unit 15 may indicate, for example, whether or not entry is possible by characters such as "passable", "impassable", figures such as circle mark, X mark, and the like, colors such as "red", "green", and the like, but is not particularly limited.

The control device 20 is a computer such as a server for controlling various processes in the imaging device 10. Specifically, the control device 20 detects the position of the eyes of the user U (person to be authenticated) based on the overall image captured by the visible light camera 11, selects the infrared light camera 12b corresponding to the height of the eyes of the user U, and captures an image of the iris of the user U.

Further, the control device 20 extracts an iris image from the image of the eyes captured by the infrared light camera 12b, and requests the authentication device 30 to execute iris authentication based on the iris image. Then, the control device 20 displays the authentication result in the authentication device 30 on the display unit 15. In a state where characters or the like are displayed on the display unit 15, since the line of sight of the user U is easily guided toward the display unit 15, the control device 20 preferably controls the display unit 15 not to be displayed before capturing an image of the iris of the user U by the infrared light camera 12b.

The authentication device 30 is a computer such as a server which executes authentication process in response to an authentication request from the control device 20. Specifically, the authentication device 30 performs matching process between an iris image (or feature amount) captured by the infrared camera 12b and a registered iris image (or feature amount) registered in the biometric information database 31, and authenticates the user U based on the matching result.

The biometric information database 31 is a database for storing biometric information of the registrant. Specifically, the biometric information database 31 stores the images of the right and left eyes of the registrant, the iris image detected from the image of the eyes, the iris feature amount calculated from the iris image, and the like in association with the ID of the registrant. The biometric information database 31 may be configured as another device independent of the authentication device 30.

Figure 2:
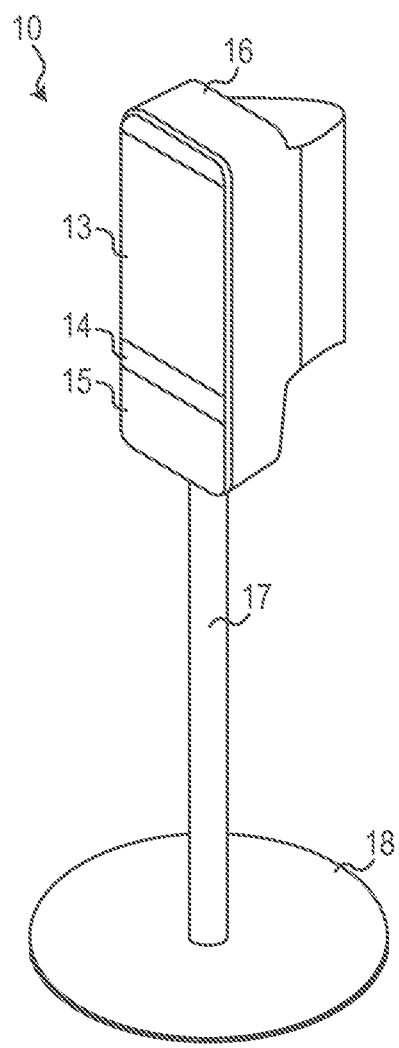
FIG. 2 is a perspective view of an imaging device according to the first example embodiment.
Figure 3:
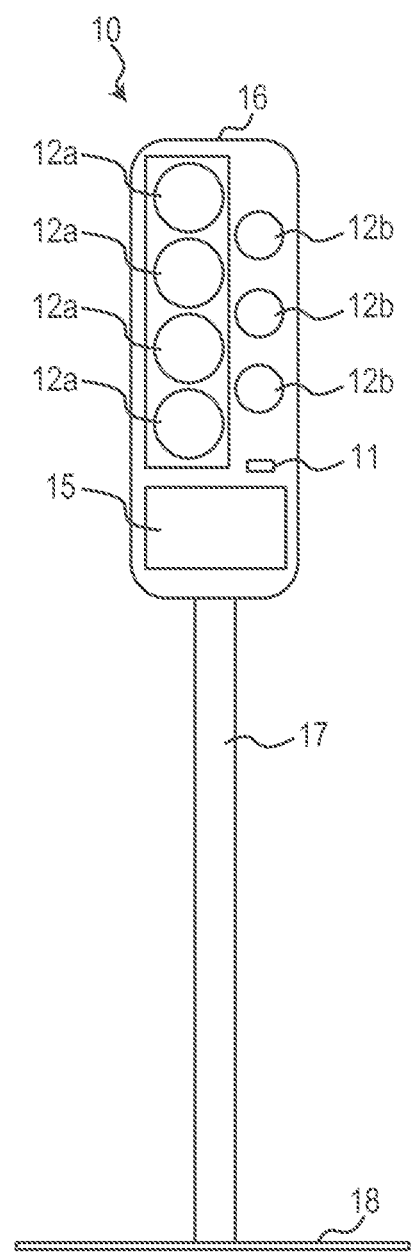
FIG. 3 is a front view of the imaging device according to the first example embodiment.
Figure 4:
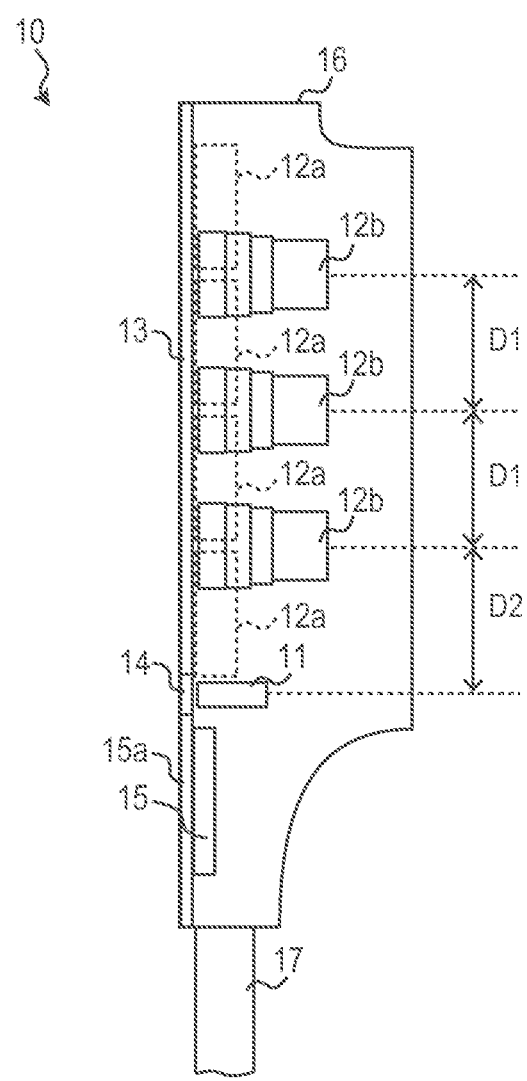
FIG. 4 is a transparent side view of the imaging device according to the first example embodiment.

Next, the structure of the imaging device 10 will be described with reference to FIGS. 2 to 4. FIG. 2 is a perspective view of the imaging device 10. FIG. 3 is a front view of the imaging device 10. FIG. 4 is a transparent side view of the imaging device 10.

In FIG. 2, the bandpass filter 13, the half mirror 14, and the display unit 15 are arranged on the same side of a housing 16. The bandpass filter 13 is arranged above the half mirror 14 in the vertical direction. On the other hand, the display unit 15 is arranged below the half mirror 14 in the vertical direction. The visible light camera 11 and the iris imaging camera 12 are arranged in the housing 16 (see FIGS. 3 and 4).

A bottom portion of the housing 16 is connected to an upper end portion of the support post 17. The length of the support post 17 may be appropriately changed in accordance with the range of height of the person to be authenticated. In addition, it is preferable that an internal space is formed in the support post 17, and power supply cables (not illustrated) of the visible light camera 11, the iris imaging camera 12 (the infrared light irradiation device 12a and the infrared light camera 12b), and the display unit 15 are arranged in the internal space along the central axis. A lower end portion of the support post 17 is connected to a disk-shaped support base 18.

FIG. 3 illustrates the imaging device in a state where the bandpass filter 13, the half mirror 14, and a cover 15a (see FIG. 4) covering the front face of the display unit 15 are removed from the housing 16. As illustrated in FIGS. 3 and 4, on the left side of the housing 16, four infrared light irradiation devices 12a are arranged side by side in a vertical direction and in a straight line in a front view. On the right side of four infrared light irradiation devices 12a, three infrared light cameras 12b are arranged side by side in the vertical direction and in a straight line.

As illustrated in FIG. 4, only one bandpass filter 13 is provided on the housing 16 so as to cover a light receiving surface of each of the plurality of infrared light cameras 12b and not to cover the light receiving surface of the visible light camera 11. Therefore, only infrared light of a predetermined wavelength can be selectively incident on the infrared light camera 12b. In addition, there is an advantage that attachment to the housing 16 is easy and manufacturing cost can be suppressed.

On the other hand, the half mirror 14 is provided so as to cover the light receiving surface of the visible light camera 11. Since the infrared light is not incident on the visible light camera 11, the control device 20 can detect the face (especially the eyes) of the user U from the overall image with high accuracy.

The visible light camera 11 is arranged below the infrared light camera 12b and the bandpass filter 13. Therefore, the visible light camera 11 can capture an image of the face of the user U more easily than when the visible light camera 11 is arranged above the infrared light camera 12b and the bandpass filter 13.

The three infrared light cameras 12b are arranged at a constant distance D1 in the vertical direction. This makes it easy to associate the height position of the eyes of the user U who is the imaging target (or height range of the user) with the infrared light camera 12b used for capturing an image of the iris. The distance D2 between the infrared light camera 12b at the lowest position and the visible light camera 11 may be different from or equal to the distance D1.

A transparent cover 15a made of acrylic resin or the like is provided on the front of the display unit 15. Instead of the cover 15a, the half mirror 14 may be provided.

Further, the light receiving surfaces of the three infrared light cameras 12b are aligned on a straight line at different heights in the vertical direction. Thus, the focal positions of the plurality of infrared light cameras 12b are aligned on a straight line in the vertical direction.

It is preferable that the angle of view of each of the plurality of infrared light cameras 12b is set so that the iris of both eyes of the user U can be simultaneously captured. In this case, more features can be acquired than in the case of capturing only one eye in one-time capture.

Figure 5:
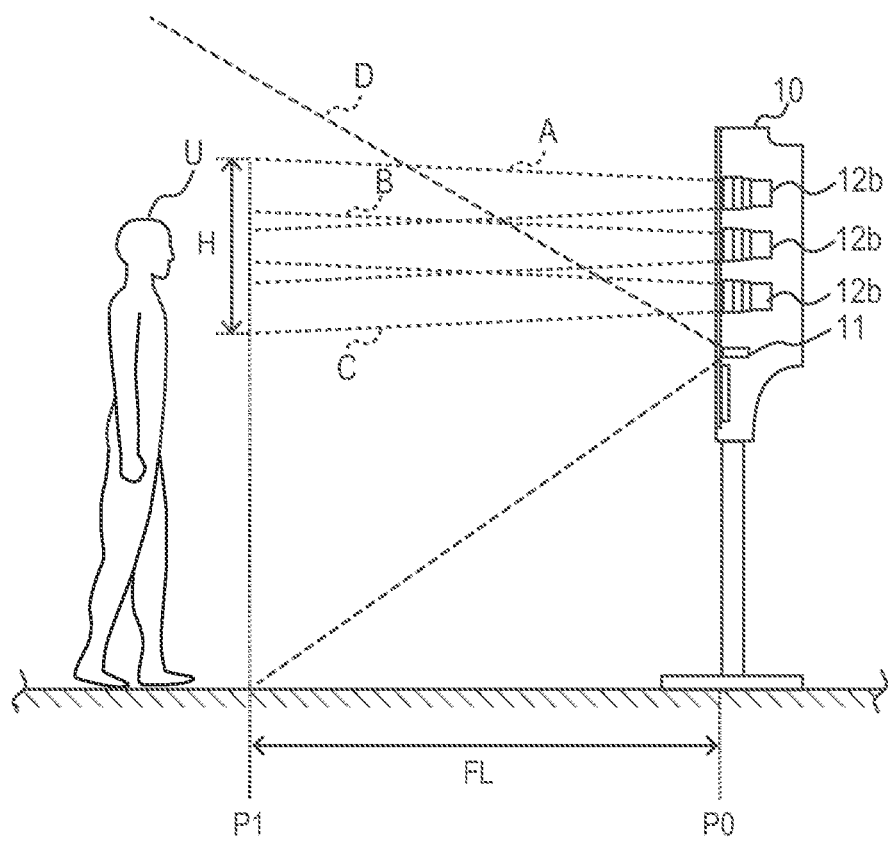
FIG. 5 is a view for explaining a visual field range in a vertical direction of the imaging device according to the first example embodiment.

FIG. 5 is a diagram illustrating a visual field range in the vertical direction of the imaging device 10. In this example, when the user U moves to a position P1, the imaging process is performed by any one of the three infrared light cameras 12b. The position P1 is separated from a position P0 where the imaging device 10 is arranged by the focal length FL. The visual field ranges of the three infrared light cameras 12b arranged in the vertical direction are indicated by broken lines. The visual field ranges A and B overlap at the position P1 in part and the visual field ranges B and C overlap at the position P1 in part. The three visual field ranges A, B, and C form one large visual field range as a whole. The length of the visual field range in the vertical direction is indicated by reference numeral H. It is assumed that the horizontal length of the visual field range is common among the three infrared light cameras 12b. The visual field range D of the visible light camera 11 is set to be wide enough to capture an image of the entire body of the user U. For example, at a position away from the visible light camera 11 by the focal length FL, the angle of view of the visible light camera 11 is set such that the visual field range D includes a range up to a height of about three meters from the ground in the vertical direction. Thus, when the user U is at the focal length FL of the infrared light camera 12b, the visible light camera 11 can substantially capture an image of the user U from the foot to the head irrespective of the height of the user U.

Generally, in order to perform iris authentication with high accuracy, it is necessary to capture a high-resolution image at a high frame rate while the user U is in the depth of field. However, it is difficult to satisfy the level of the captured image required by one general-purpose camera.

On the other hand, in the imaging device 10 of the present example embodiment, three infrared light cameras 12b are arranged in the vertical direction, and the infrared light camera 12b for capturing an image of the eyes of the user U is selected. At this time, the control device 20 also determines a region of interest to be read out at high speed in the selected infrared light camera 12b. The region of interest is determined in consideration of, for example, the distance between both eyes arranged in the horizontal direction and the ordinary size of an eye. The control device 20 controls the imaging process of the imaging device 10 so that the iris is included in the region of interest. Thus, the control device 20 can acquire a high-resolution iris image. That is, even when the general-purpose infrared light camera 12b is used, the level of the captured image required for iris authentication can be satisfied.

Figure 6:
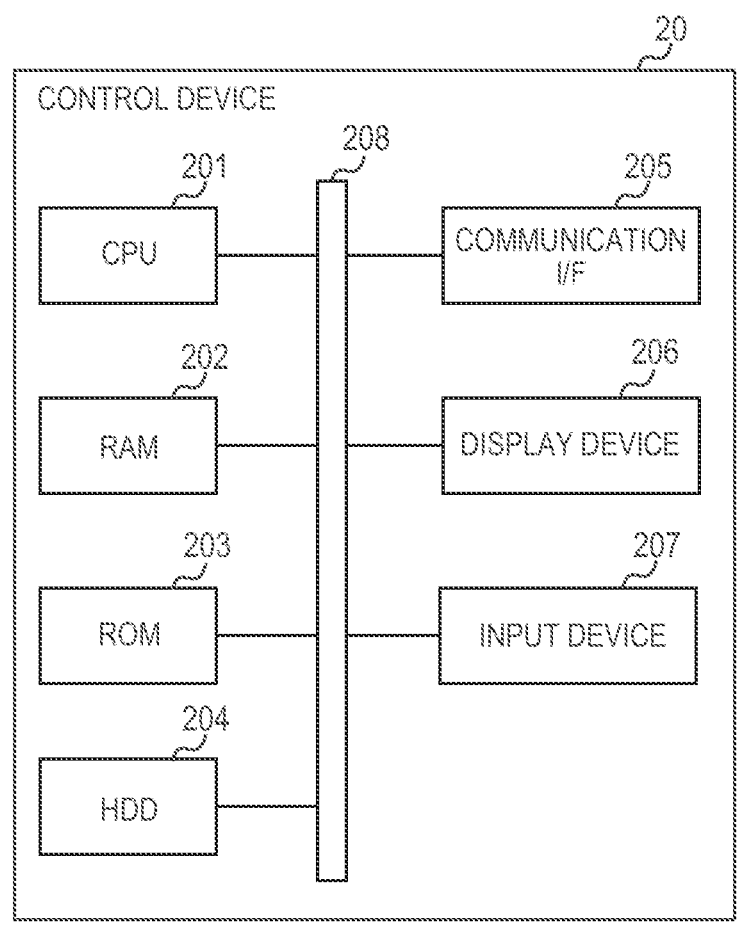
FIG. 6 is a block diagram illustrating an example of a hardware configuration of a control device according to the first example embodiment.

FIG. 6 is a block diagram illustrating an example of a hardware configuration of the control device 20. The control device 20 includes a central processing unit (CPU) 201, a random access memory (RAM) 202, a read only memory (ROM) 203, a hard disk drive (HDD) 204, a communication I/F (interface) 205, a display device 206, and an input device 207 as computers for performing arithmetic operations, control, and storage. The CPU 201, the RAM 202, the ROM 203, the HDD 204, the communication I/F 205, the display device 206, and the input device 207 are connected to each other via a bus 208 or the like.

The CPU 201 is a processor that performs predetermined operations in accordance with programs stored in the ROM 203 and the HDD 204, and also has a function of controlling each unit of the control device 20. The RAM 202 is constituted by a volatile storage medium, and provides a temporary memory area necessary for the operation of the CPU 201. The ROM 203 is constituted by a non-volatile storage medium, and stores necessary information such as a program used for the operation of the control device 20. The HDD 204 is constituted by a non-volatile storage medium, and is a storage device for storing data necessary for processing, storing an operation program of the control device 20, and the like.

The communication I/F 205 is a communication interface based on standards such as Ethernet (registered trademark), Wi-Fi (registered trademark), and 4G, and is a module for communicating with other devices.

The display device 206 is a liquid crystal display, an OLED display, or the like, and is used for displaying moving images, still images, characters, or the like.

The input device 207 is a keyboard, a pointing device, a button, etc., and receives an operation by a manager of the control device 20. The display device 206 and the input device 207 may be integrally formed as a touch panel.

Figure 7:
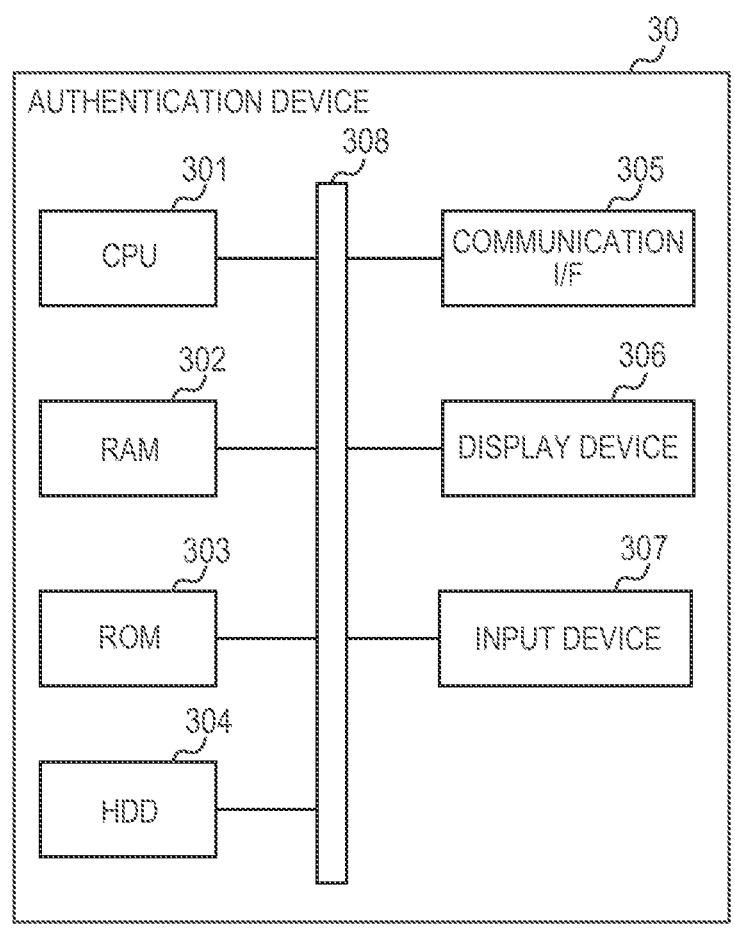
FIG. 7 is a block diagram illustrating an example of a hardware configuration of an authentication device according to the first example embodiment.

FIG. 7 is a block diagram illustrating an example of a hardware configuration of the authentication device 30. The authentication device 30 includes a CPU 301, a RAM 302, a ROM 303, an HDD 304, a communication I/F 305, a display device 306, and an input device 307. The CPU 301, the RAM 302, the ROM 303, the HDD 304, the communication I/F 305, the display device 306, and the input device 307 are connected to each other via a bus 308 or the like. The functions of the authentication device 30 are the same as those of the control device 20.

The hardware configuration illustrated in FIGS. 6 and 7 is an example, and other devices may be added or some devices may not be provided. Some devices may be replaced by other devices having similar functions. Also, some functions of present example embodiment may be provided by other devices via the network NW, and functions of the present example embodiment may be realized by being distributed among a plurality of devices. As described above, the hardware configuration illustrated in FIGS. 7 and 8 can be changed appropriately.

Figure 8:
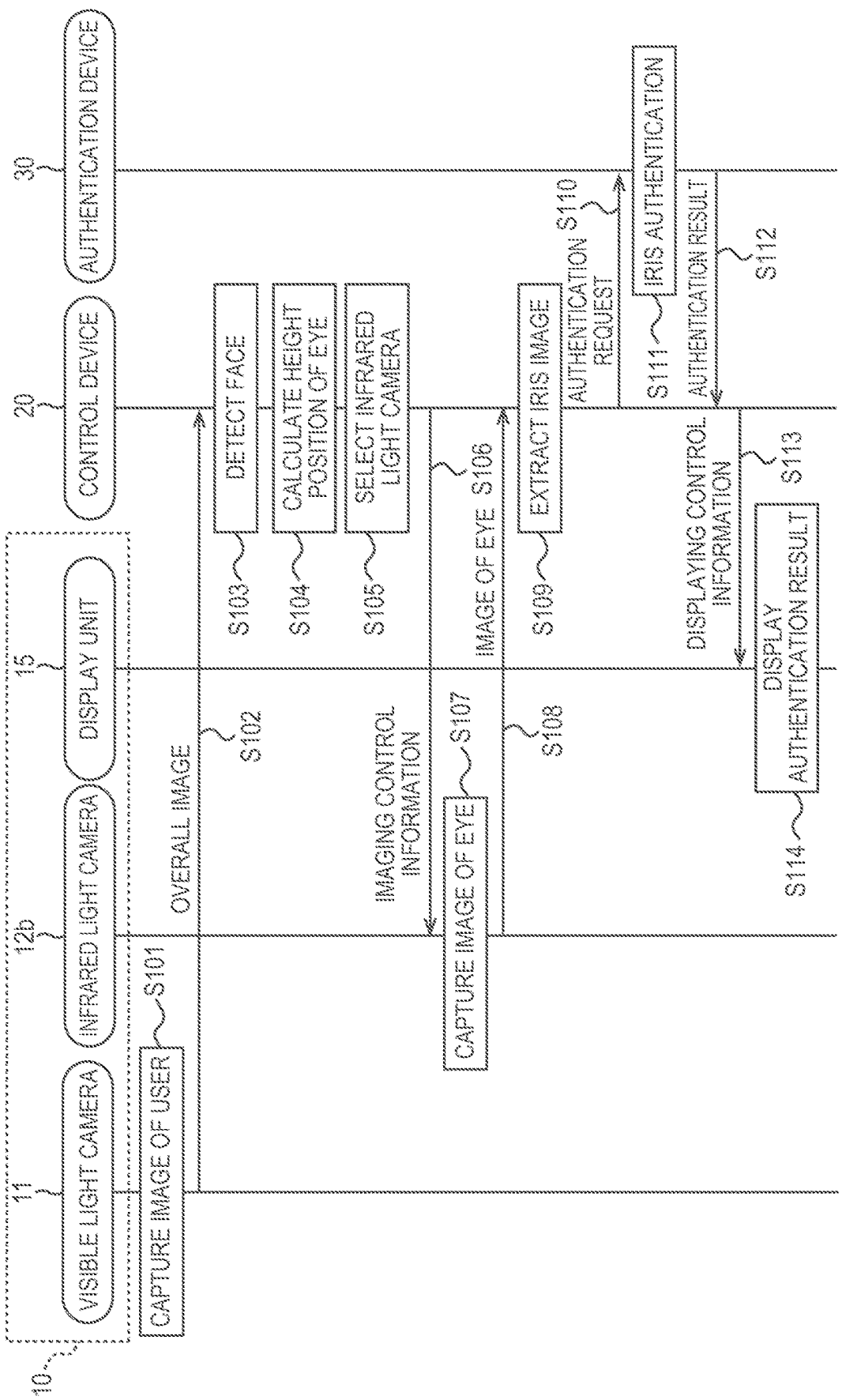
FIG. 8 is a sequence diagram illustrating an example of a process of the iris authentication system according to the first example embodiment.

FIG. 8 is a sequence diagram illustrating an example of a process of the iris authentication system 1 according to the present example embodiment.

First, when the visible light camera 11 captures an image of a user U existing in the authentication area (step S101), the visible light camera 11 outputs an overall image of the user U to the control device 20 (step S102). The process in the steps S101 and S102 are repeated at a constant cycle.

Next, when the control device 20 detects a face of the user U from the overall image received from the visible light camera 11 (step S103), the control device 20 calculates the height position of the eyes of the user U (step S104).

Next, the control device 20 selects one infrared light camera 12b corresponding to the height of the eyes calculated in the step S104 from the plurality of infrared light cameras 12b (step S105).

Next, the control device 20 outputs imaging control information for capturing the iris of the user U to the infrared camera 12b selected in the step S105 (step S106). That is, the control device 20 controls to irradiate the infrared light toward the face of the user U with infrared light from the plurality of infrared light irradiation devices 12a, and to capture an image of the eyes of the user U with the infrared light camera 12b whose field of view includes the height position of the eyes of the user U.

The infrared light is irradiated in the face direction of the user U from the infrared light irradiation device 12a corresponding to at least the height position of the eyes of the user U among the plurality of infrared light irradiation devices 12a. For example, in the example of FIG. 3, when the imaging process is performed by the infrared light camera 12b arranged at the highest position, it is preferable to irradiate infrared light in the face direction of the user U from the infrared light irradiation device 12a arranged at either the highest position and the center position or both of the highest position and the center position in synchronization with the imaging process.

Next, the infrared light camera 12b captures an image of the eyes of the user U based on the imaging control information received from the control device 20 (step S107), and outputs the image of the eyes to the control device 20 (step S108). The size of the image of the eyes captured by each of the plurality of infrared light cameras 12b in the present example embodiment is set so that both eyes are included in an image. The process in the steps S107 and S108 are repeatedly executed at a predetermined frame rate.

Next, when the control device 20 acquires the image of the eyes of the user U from the infrared camera 12b, the control device 20 specifies the positions of the iris of both eyes in the image of the eyes and extracts an iris image of both eyes (step S109).

Next, the control device 20 transmits an authentication request based on the iris images of both eyes of the user U to the authentication device 30 (step S110).

When the authentication device 30 receives the authentication request from the control device 20, the authentication device 30 matches the iris images of both eyes of the user U with the iris images of the registrant previously stored in the biometric information database 31. The authentication device 30 executes iris authentication based on the matching result of the matching process (step S111), and transmits the authentication result to the control device 20 (step S112).

When the control device 20 receives the authentication result from the authentication device 30, the control device 20 outputs displaying control information for displaying the authentication result on the display unit 15 (step S113). The display unit 15 displays the authentication result on the screen based on the displaying control information input from the control device 20 (step S114).

In general, in an authentication method using an image such as iris authentication, the authentication accuracy is enhanced by using an image in which the user's face image is captured from the front. However, when the user U can view a plurality of cameras from the outside, there may be a problem that the user U looks at a camera other than the camera which is at an optimum height for capturing the iris image.

On the other hand, in the present example embodiment, each of the light receiving surfaces of the plurality of infrared light cameras 12b is covered with one bandpass filter 13 (optical filter). That is, since the imaging device 10 in the present example embodiment is configured such that the user U is not allowed to visually recognize the plurality of infrared light cameras 12b from the outside, the user U naturally faces the imaging device 10 in the front direction, and the above-mentioned problem does not occur. As described above, according to the present example embodiment, since the imaging device 10 can image the face of the user U with the infrared camera 12b positioned in the front direction, the authentication device 30 can perform the iris authentication of the user U with higher accuracy.

In particular, the bandpass filter 13 according to the present example embodiment is visually recognized as a mirror surface when viewed from the user U. The image of the user U is reflected on the bandpass filter 13. Since the user U directly looks at one's face reflected on the bandpass filter 13, the user U naturally faces the imaging device 10. As described above, since the configuration is such that the user U can easily confirm one's face on the mirror surface, the accuracy of iris authentication can be further enhanced.

Second Example Embodiment

The iris authentication system 1 according to a second example embodiment will be described below. Hereinafter, the differences with first example embodiment will be mainly explained, and descriptions of common parts will be omitted or simplified.

Figure 9:
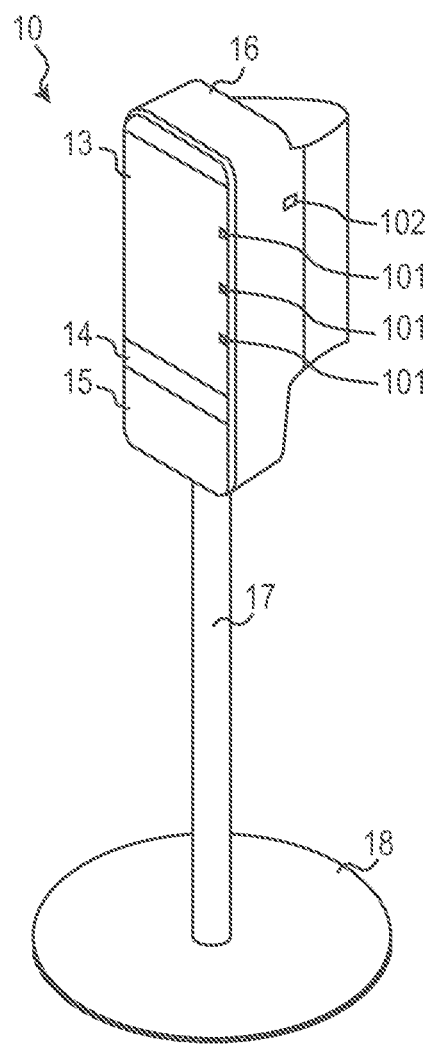
FIG. 9 is a perspective view of an imaging device according to a second example embodiment.

FIG. 9 is a perspective view of an imaging device 10 according to the present example embodiment. As illustrated in FIG. 9, the imaging device 10 in the present example embodiment further includes three eye guidance units 101 in the plane where the bandpass filter 13 is arranged. Three eye guidance units 101 are arranged at heights corresponding to the positions of the three infrared light cameras 12b illustrated in FIG. 3. The eye guidance unit 101 is a member for guiding a line of sight of the user U toward height of one of the plurality of infrared light cameras 12b.

The imaging device 10 further includes an indicator 102 on a side surface of the housing 16. The indicator 102 is a member indicating the operation state of the device. As the eye guidance unit 101 and the indicator 102, for example, an LED capable of emitting light in a plurality of colors is preferably used.

For example, when the infrared light camera 12b at the highest position is to perform the imaging process, the control device 20 can guide the line of sight of the user U in a desired direction by causing only the eye guidance unit 101 at the highest position to emit light. The indicator 102 may be, for example, "red" to indicate "device is stopped" and "green" to indicate "device is in operation", but is not particularly limited.

Figure 10:
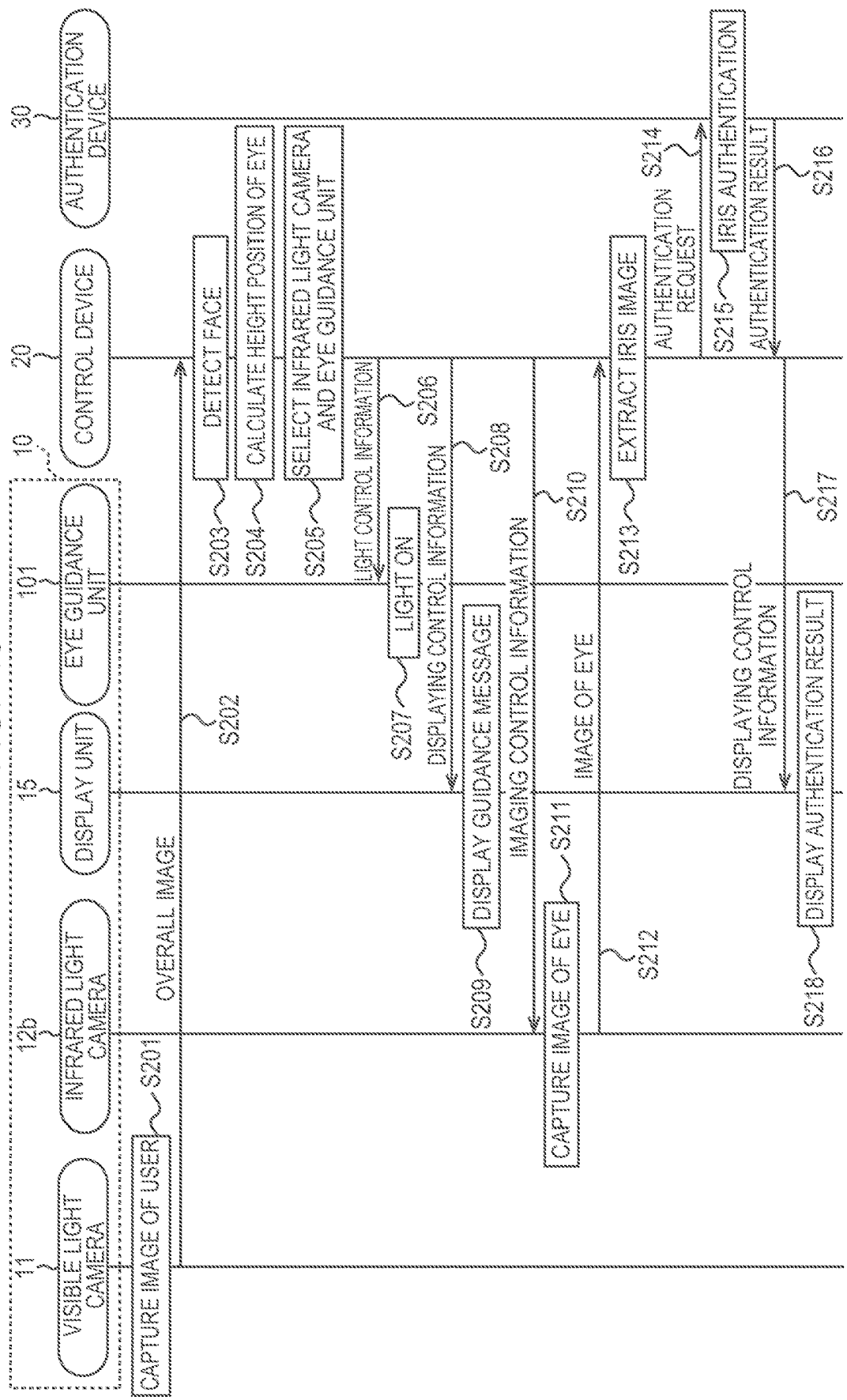
FIG. 10 is a sequence diagram illustrating an example of a process of an iris authentication system according to the second example embodiment.

FIG. 10 is a sequence diagram illustrating an example of a process of the iris authentication system 1 according to the present example embodiment.

First, when the visible light camera 11 captures an image of the user U existing in the authentication area (step S201), the visible light camera 11 outputs the overall image of the user U to the control device 20 (step S202). The process in the steps S201 and S202 are repeated at a constant cycle.

Next, when the control device 20 detects a face of the user U in the overall image received from the visible light camera 11 (step S203), the control device 20 calculates the height position of the eyes of the user U (step S204).

Next, the control device 20 selects one infrared light camera 12b and one eye guidance unit 101 according to the height of eyes calculated in the steps S204 from the plurality of infrared light cameras 12b (step S205).

Next, the control device 20 outputs light control information in order to guide the line of sight of the user U to the eye guidance unit 101 selected in the step S205 (step S206). As a result, the eye guidance unit 101 selected in the step S205 lights up based on the light control information from the control device 20 (step S207). That is, in order to guide the line of sight of the user U toward the infrared light camera 12b positioned in the front direction with respect to the height position of the eyes of the user U, the control device 20 performs control to light only the eye guidance unit 101 corresponding to the selected infrared light camera 12b.

Next, the control device 20 outputs displaying control information to the display unit 15 in order to display a guidance message regarding iris authentication to the user U (step S208). The display unit 15 displays the guidance message on the screen based on the displaying control information from the control device 20 (step S209). The display unit 15 displays, for example, guidance messages such as "Authentication will start, so please look at your face in the mirror." or "Look at the direction of the LED that is lit." are displayed, but the messages are not limited thereto. The control device 20 may display an error message such as "Authentication failed. Please face the front to capture your eyes." or "Please put off your sunglasses." on the display unit 15 based on the image analysis result of the overall image (that is, the result of the process in the steps S203 or S204 described above).

Next, the control device 20 outputs imaging control information for capturing the iris of the user U to the infrared camera 12b selected in the step S205 (step S210). That is, the control device 20 controls the infrared light irradiating the face of the user U with infrared light from the plurality of infrared light irradiation devices 12a and the infrared light camera 12b including the height position of the eyes of the user U in the field of view to capture an image of the eyes of the user U.

Next, the infrared light camera 12b captures an image of the eyes of the user U based on the imaging control information received from the control device 20 (step S211), and outputs the image of the eyes to the control device 20 (step S212). The size of the image of the eyes captured by each of the plurality of infrared light cameras 12b in the present example embodiment is set so that both eyes are included in an image. The process in the steps S211 and S212 are repeatedly executed at a predetermined frame rate.

Next, when the control device 20 acquires an image of the eyes of the user U from the infrared camera 12b, the control device 20 specifies the positions of the iris of both eyes in the image of the eyes and extracts an iris image for both eyes (step S213).

Next, the control device 20 transmits an authentication request based on the iris images of both eyes of the user U to the authentication device 30 (step S214).

When the authentication device 30 receives the authentication request from the control device 20, the authentication device 30 matches the iris images of both eyes of the user U with the iris images of the registrant previously stored in the biometric information database 31. The authentication device 30 executes iris authentication based on the matching result of the matching process (step S215), and transmits the authentication result to the control device 20 (step S216).

When the control device 20 receives the authentication result from the authentication device 30, the control device 20 outputs displaying control information for displaying the authentication result on the display unit 15 (step S217). The display unit 15 displays the authentication result on the screen based on the displaying control information input from the control device 20 (step S218).

According to the present example embodiment, the apparatus further includes a plurality of eye guidance units 101 corresponding to a plurality of infrared light cameras 12b arranged at different heights in the vertical direction. As a result, since the line of sight of the user U can be guided to a desired direction as compared with the case of the first example embodiment, the accuracy of the iris authentication can be further enhanced.

Third Example Embodiment

Figure 11:
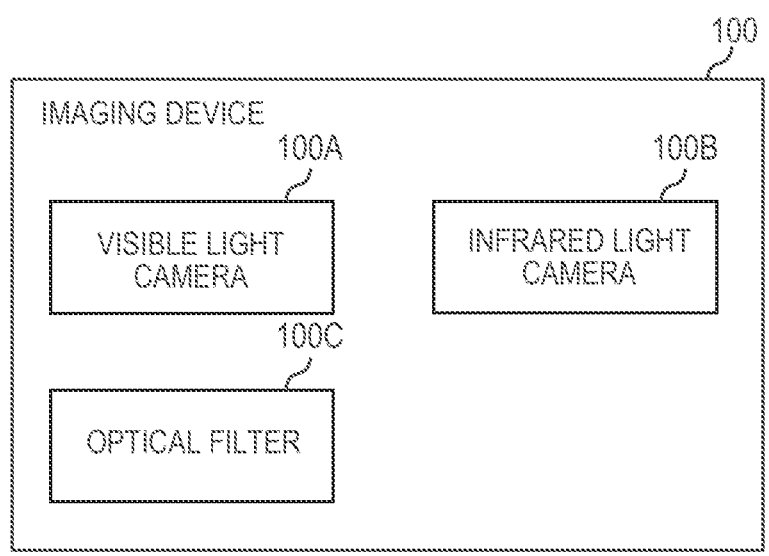
FIG. 11 is a block diagram illustrating a configuration example of an imaging device in a third example embodiment.

FIG. 11 is a block diagram illustrating a configuration example of the imaging device 100 according to a third example embodiment. The imaging device 100 includes a visible light camera 100A, a plurality of infrared light cameras 100B, and an optical filter 100C. The visible light camera 100A captures an image of a face of a person to be authenticated. The plurality of infrared light cameras 100B is provided on a housing with the visible light camera 100A and captures an image of an iris of the person to be authenticated. The optical filter 100C is provided on the housing so as to cover a light receiving surface of each of the plurality of infrared light cameras 100B and not to cover a light receiving surface of the visible light camera 100A, and has a pass band in an infrared region and a blocking band in a visible region. According to the present example embodiment, the accuracy of the iris authentication can be enhanced.

Modified Example Embodiment

This disclosure is not limited to the above-described example embodiments, and can be suitably modified within the scope of this disclosure. For example, an example in which a configuration of a part of any example embodiment is added to another example embodiment or an example in which a configuration of a part of any example embodiment is replaced with a part of another example embodiment is also an example embodiment of this disclosure.

In the example embodiment described above, the control device 20 calculates the height of eyes of the user U from the overall image captured by the visible light camera 11, and selects one infrared light camera 12b corresponding to the height of eyes from among the plurality of infrared light cameras 12b having different heights. However, the imaging process by the plurality of infrared light cameras 12b and the imaging process by the visible light camera 11 may be performed in parallel.

For example, the control device 20 may select an optimal image of the eyes corresponding to the height of eyes calculated based on the overall image from the images input from the plurality of infrared light cameras 12b, and extract the iris image. In this case, since the imaging time of the overall image can be synchronized with the imaging time of the image of the eyes, even when the height of eyes of the user U fluctuates in time (for example, when the user U is walking), an optimum image of the eyes corresponding to the height of eyes calculated based on the overall image can be selected. When the eyes of the user U are positioned in an area where the visual fields of the two adjacent infrared light cameras 12b overlap, a more appropriate iris image can be selected from the two iris images and used for authentication.

Figure 12:
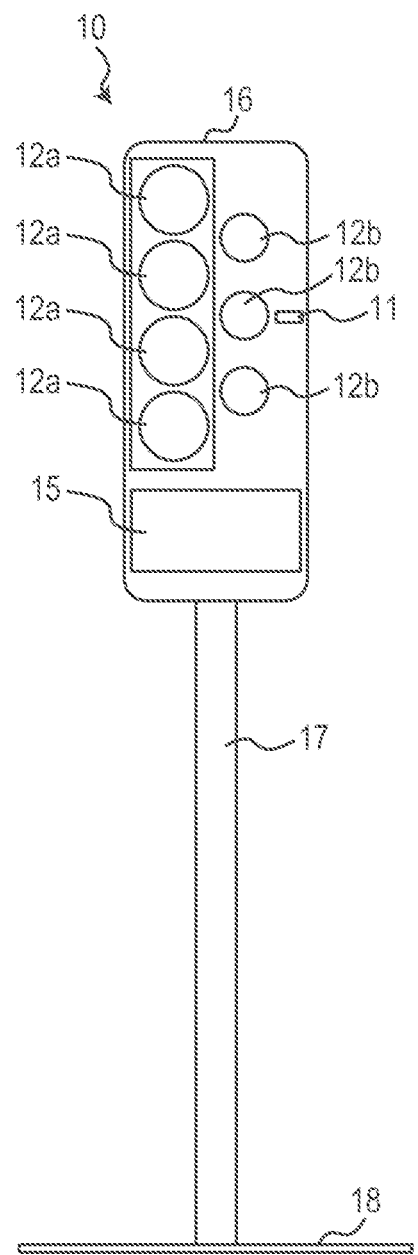
FIG. 12 is a front view of an imaging device according to a modified example embodiment.
Figure 13:
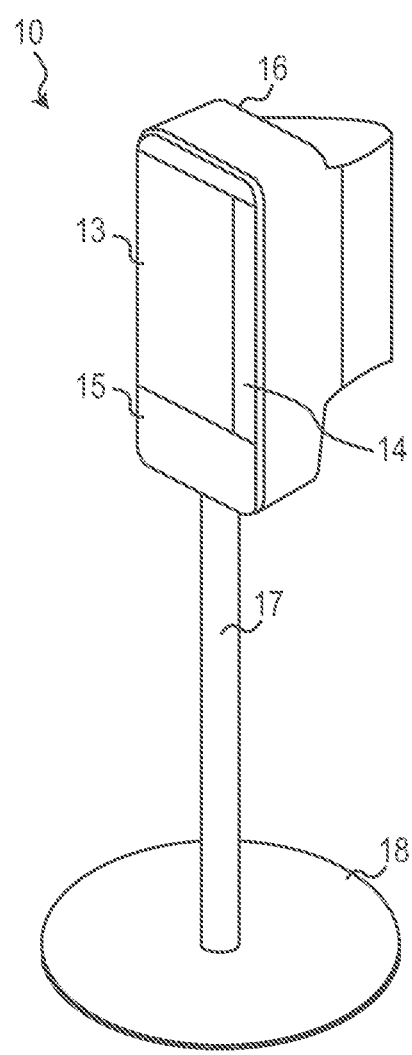
FIG. 13 is a perspective view of the imaging device according to the modified example embodiment.

In the example embodiment described above, the visible light camera 11 is arranged below a plurality of infrared light cameras 12b and a bandpass filter 13 aligned in the vertical direction. However, the positional relation of the visible light camera 11 with the plurality of infrared light cameras 12b is not particularly limited. The visible light camera 11 may be arranged, for example, on the side of a plurality of infrared light cameras 12b arranged in the vertical direction. FIGS. 12 and 13 are front and perspective views of the imaging device 10 according to the modified example embodiment. In FIG. 12, the visible light camera 11 is arranged on the right side of the infrared light camera 12b positioned at the center. In FIG. 13, the half mirror 14 is arranged on the right side of the bandpass filter 13, corresponding to the arrangement of the visible light camera 11 illustrated in FIG. 12. In this case, since the height of the visible light camera 11 and the plurality of infrared light cameras 12b can be made closer, an appropriate infrared light camera 12b can be selected from the plurality of infrared light cameras 12b.

FIGS. 14 to 23 are front views of the imaging device 10 according to the modified example embodiment. As illustrated in each figure, the positional relationship between the plurality of infrared light irradiation devices 12a, the plurality of infrared light cameras 12b, and the display unit 15 on the same surface side of the housing 16 is not particularly limited. The number and shape of each device are not particularly limited either.

Figure 14:
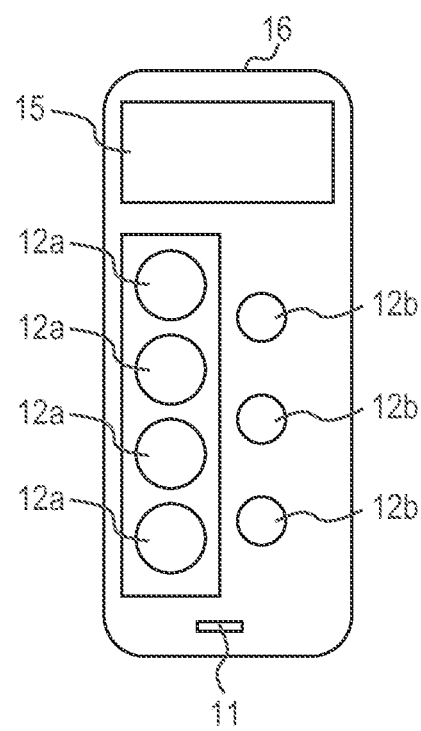
FIG. 14 is a front view of the imaging device according to the modified example embodiment.
Figure 15:
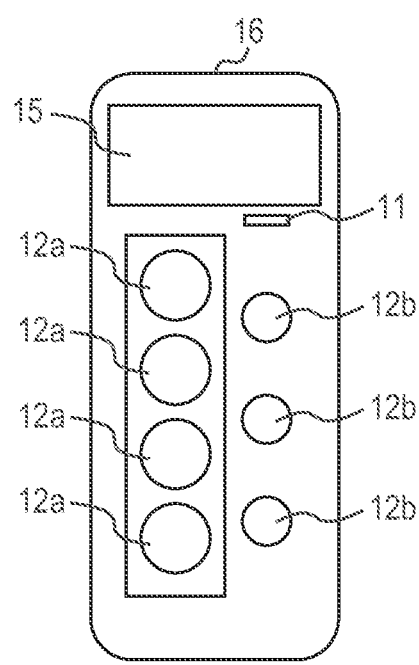
FIG. 15 is a front view of the imaging device according to the modified example embodiment.

For example, unlike the above-described example embodiment (see FIG. 3), the display unit 15 may be arranged above the plurality of infrared light irradiation devices 12a and the plurality of infrared light cameras 12b in the vertical direction (see FIGS. 14 and 15). The display unit 15 may have a shape longer in the vertical direction (vertical direction) than in the horizontal direction (horizontal direction), and the length in the vertical direction may be appropriately changed (see FIGS. 16 and 17).

The visible light camera 11 may be arranged between the display unit 15 and the infrared light cameras 12b when the display unit 15 is arranged above the infrared light irradiation devices 12a and the infrared light cameras 12b in the vertical direction (see FIG. 15).

The visible light camera 11 may be arranged at the center in the horizontal direction (See FIGS. 14, 19, 20, 22 and 23). The visible light camera 11 may not be aligned with the plurality of infrared light irradiation devices 12a in the vertical direction (See FIGS. 14, 16, 18, 19, 20 and 23).

Figure 19:
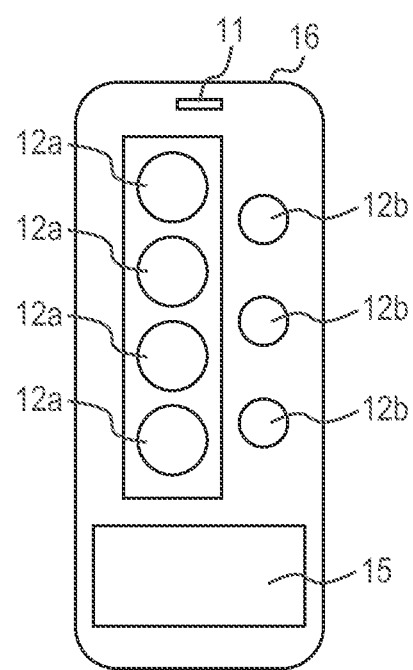
FIG. 19 is a front view of the imaging device according to the modified example embodiment.
Figure 20:
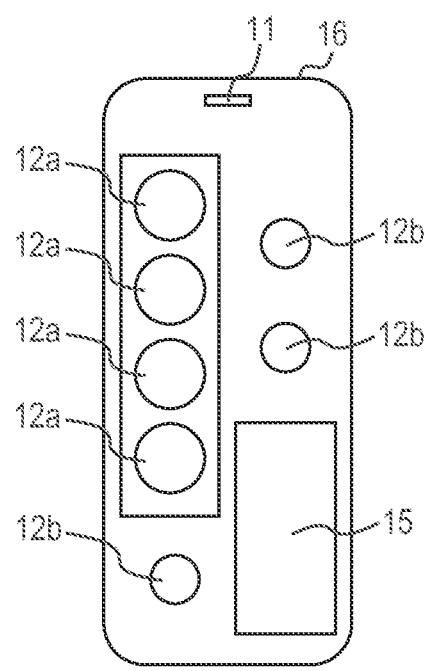
FIG. 20 is a front view of the imaging device according to the modified example embodiment.

The visible light camera 11 may be arranged on the left side of the plurality of infrared light cameras 12b (see FIG. 18), or may be arranged above the plurality of infrared light cameras 12b (See FIGS. 15, 19 and 20).

Figure 16:
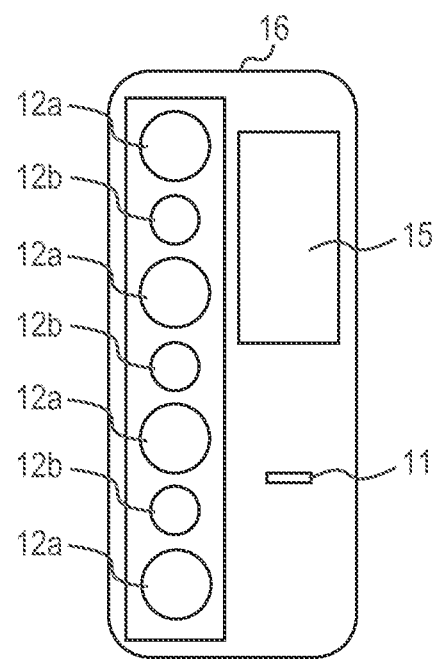
FIG. 16 is a front view of the imaging device according to the modified example embodiment.
Figure 17:
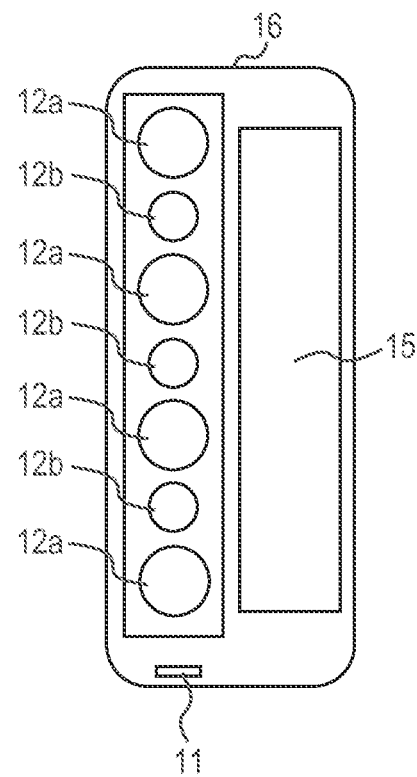
FIG. 17 is a front view of the imaging device according to the modified example embodiment.
Figure 18:
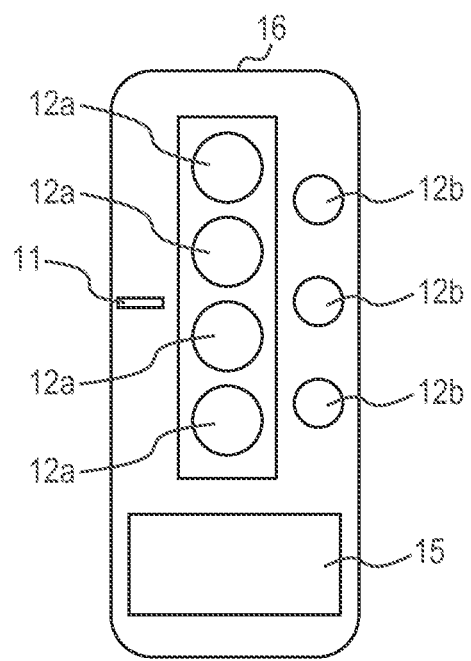
FIG. 18 is a front view of the imaging device according to the modified example embodiment.

The plurality of infrared light irradiation devices 12a and the plurality of infrared light cameras 12b may be arranged in a straight line in the vertical direction and alternately (see FIGS. 16 and 17). In this case, the display unit 15 and the visible light camera 11 may be arranged on the right side of the plurality of infrared light irradiation devices 12a and the plurality of infrared light cameras 12b (see FIGS. 16 and 17). The plurality of infrared light cameras 12b may be partially arranged below the plurality of infrared light irradiation devices 12a (see FIG. 20).

Figure 21:
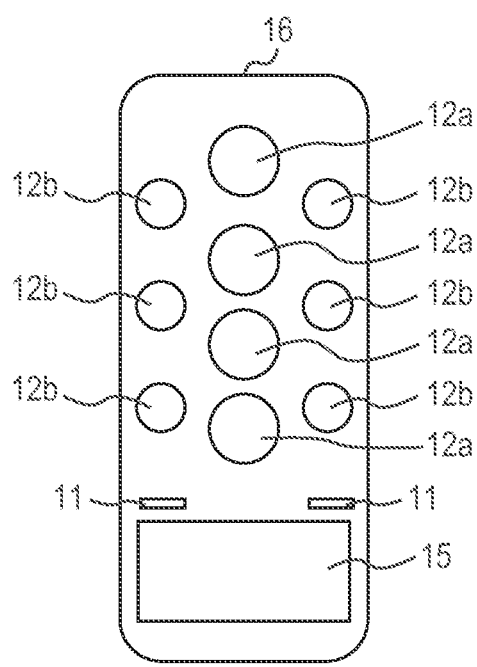
FIG. 21 is a front view of the imaging device according to the modified example embodiment.
Figure 22:
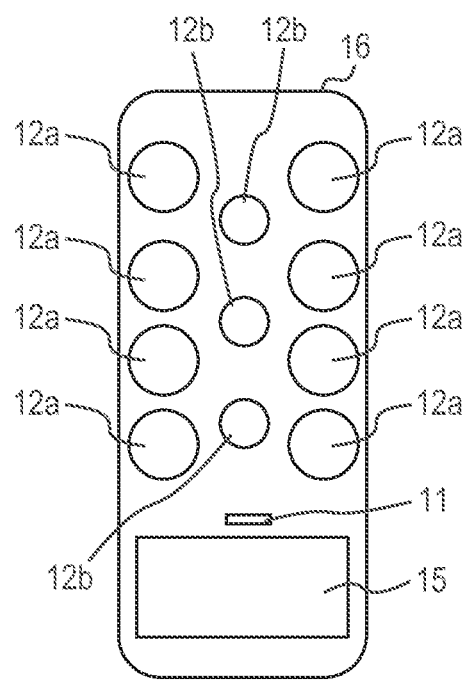
FIG. 22 is a front view of the imaging device according to the modified example embodiment.
Figure 23:
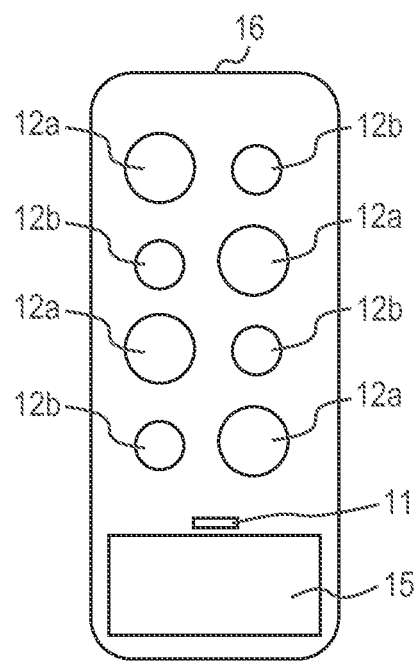
FIG. 23 is a front view of the imaging device according to the modified example embodiment.

The number of infrared light irradiation devices 12a and infrared light cameras 12b may be increased or decreased (See FIGS. 21, 22 and 23). In the example of FIG. 21, there are six infrared light cameras 12b, three on each side symmetrically around the four infrared light irradiation devices 12a. In addition, two visible light cameras 11 are arranged side by side on the right and left sides so as to correspond to the arrangement of the infrared light cameras 12b divided into the right and left two rows. On the other hand, in the example of FIG. 22, there are eight infrared light cameras 12b, four on each side symmetrically around the three infrared light irradiation devices 12a. A plurality of infrared light cameras 12b may be arranged separately on different vertical axes. In the example of FIG. 23, four infrared light irradiation devices 12a and four infrared light cameras 12b are divided into two rows in the left-right direction (horizontal direction) and alternately arranged in the left-right direction and the vertical direction (vertical direction).

In the example embodiment described above, the authentication device 30 performs one-element authentication based on an iris image. However, the authentication device 30 may perform matching using both the face image and the iris image, and may perform two-elements authentication for performing authentication by integrating the results of both. For example, the control device 20 may detect the face image of the user U from the overall image input from the visible light camera 11 and transmit the face image to the authentication device 30 together with the iris image acquired from the infrared light camera 12b.

Figure 24:
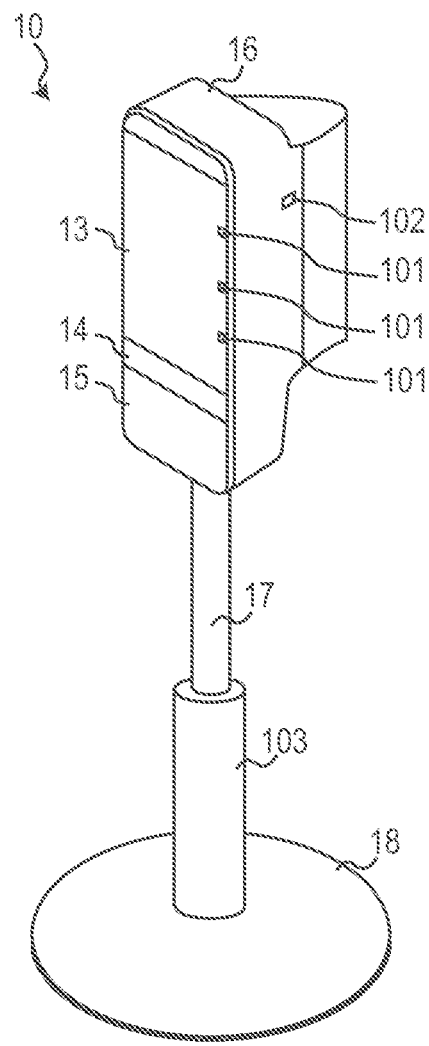
FIG. 24 is a perspective view of the imaging device according to the modified example embodiment.

Although the above-described example embodiment has described a configuration in which the height from the support base 18 of the imaging device 10 to the housing 16 is constant, the height may be changed. FIG. 24 is a perspective view of the imaging device 10 according to the modified example embodiment. Here, a configuration is illustrated in which a driving device 103 capable of driving the housing 16 in the vertical direction is further provided at a lower portion of the support post 17. For example, when the control device calculates the height of eyes of the user U based on the overall image, the control device 20 can output driving control information for moving the housing 16 up and down in accordance with the height of eyes to the driving device 103. The driving device 103 adjusts the height of the housing 16 based on the driving control information. For example, the driving device 103 includes a motor and drives the housing 16 in the vertical direction by the driving force generated by the motor. In this case, it is possible to flexibly correspond to the height of a plurality of persons to be authenticated.

The configuration of the iris authentication system 1 is an example, and further devices other than the imaging device 10, the control device 20, and the authentication device 30 may be provided. For example, a gate device having an opening/closing member (for example, a door) which opens/closes based on the authentication result in the authentication device 30 and a guide member (for example, ropes, fences, guide lights) which defines a movement path of the user U may be further provided. In order to estimate the height of the user U, another camera other than the visible light camera 11 and the infrared light camera 12b may be further provided. Thus, the gate system by iris authentication can be easily constructed.

The imaging device 10 and the control device 20 may be provided integrally in the same apparatus, or may be provided at a separate location. Similarly, the control device 20 and the authentication device 30 may be provided integrally in the same device or may be provided at a separate location.

A processing method in which a program for operating the configuration of the above-described example embodiment is stored in a storage medium so as to implement the functions of the above-described example embodiment, the program stored in the storage medium is read as code, and the program is executed in a computer is also included in the scope of each example embodiment. That is, a computer-readable storage medium is also included in the scope of the example embodiments. Further, not only the storage medium in which the above program is stored, but also the program itself is included in each example embodiment.

As the storage medium, for example, a floppy (registered trademark) disk, a hard disk, an optical disk, a magneto-optical disk, a CD-ROM, a magnetic tape, a non-volatile memory card, or and the like can be used. Further, the scope of each example embodiment is not limited to the case where the processing is executed by the program alone stored in the storage medium, and a case where the processing is executed by operating on an OS in cooperation with the functions of other software and extension board is also included in the scope of each example embodiment.

The whole or part of the example embodiments disclosed above can be described as, but not limited to, the following supplementary notes.

(Supplementary Note 1)

An imaging device comprising:
  a visible light camera that captures an image of a face of a person to be authenticated;
  a plurality of infrared light cameras that is provided on a housing with the visible light camera and captures an image of an iris of the person to be authenticated; and
  an optical filter that is provided on the housing so as to cover a light receiving surface of each of the plurality of infrared light cameras and not to cover a light receiving surface of the visible light camera, and has a pass band in an infrared region and a blocking band in a visible region.

(Supplementary Note 2)

The imaging device according to supplementary note 1, wherein the optical filter has a mirror surface that reflects light in the visible region.

(Supplementary Note 3)

The imaging device according to supplementary note 1 or 2, wherein each of the light receiving surfaces of the plurality of infrared light cameras is covered with the optical filter.

(Supplementary Note 4)

The imaging device according to any one of supplementary notes 1 to 3 further comprising a half mirror that is provided so as to cover the light receiving surface of the visible light camera.

(Supplementary Note 5)

The imaging device according to supplementary note 4, wherein the half mirror reflects a part of lights in the visible region incident from the person to be authenticated and transmits another part of the lights to the visible light camera.

(Supplementary Note 6)

The imaging device according to any one of supplementary notes 1 to 5, wherein the plurality of infrared light cameras simultaneously captures an image of the iris of both eyes of the person to be authenticated.

(Supplementary Note 7)

The imaging device according to any one of supplementary notes 1 to 6 further comprising a display unit that displays information with respect to iris authentication.

(Supplementary Note 8)

The imaging device according to any one of supplementary notes 1 to 7 further comprising an indicator that indicates operation status of a device.

(Supplementary Note 9)

The imaging device according to any one of supplementary notes 1 to 8, wherein the plurality of infrared light cameras are arranged side by side in the vertical direction.

(Supplementary Note 10)

The imaging device according to supplementary note 9, wherein the plurality of infrared light cameras are arranged at a constant distance.

(Supplementary Note 11)

The imaging device according to supplementary note 9 or 10 further comprising an eye guidance unit that guides a line of sight of the person to be authenticated toward height of one of the plurality of infrared light cameras.

(Supplementary Note 12)

The imaging device according to any one of supplementary notes 9 to 11, wherein the visible light camera is arranged below the plurality of infrared light cameras aligned in the vertical direction.

(Supplementary Note 13)

The imaging device according to any one of supplementary notes 9 to 11, wherein the visible light camera is arranged on the side of the plurality of infrared light cameras aligned in the vertical direction.

(Supplementary Note 14)

An iris authentication system comprising:

an imaging device according to any one of supplementary notes 1 to 13;
a control device that controls the imaging device based on an overall image including the face of the person to be authenticated captured by the visible light camera; and
an authentication device that performs iris authentication of the person to be authenticated based on an iris image captured by the infrared light camera.

(Supplementary Note 15)

The iris authentication system according to supplementary note 14, wherein the control device causes the infrared light camera corresponding to height of the eye of the person to be authenticated acquired from the overall image, out of the plurality of infrared light cameras, to capture the iris.

(Supplementary Note 16)

The iris authentication system according to supplementary note 14, wherein the authentication device performs the iris authentication based on the iris image captured by the infrared light camera corresponding to the height of the eye of the person to be authenticated acquired from the overall image, out of the iris images captured by the plurality of infrared light cameras respectively.

(Supplementary Note 17)

The iris authentication system according to supplementary note 14 further comprising a driving device that drives the housing in a vertical direction, wherein the control device controls the driving of the driving device based on the height position of the eye of the person to be authenticated acquired from the overall image.

(Supplementary Note 18)

The iris authentication system according to supplementary note 15, wherein the authentication device performs face authentication of the person to be authenticated based on the overall image and authenticates the person to be authenticated based on results of the face authentication and the iris authentication.

DESCRIPTION OF SIGNS

NW network
1 iris authentication system
10 imaging device
11 visible light camera
12 iris imaging camera
12a infrared light irradiation device
12b infrared light camera
13 bandpass filter
14 half mirror
15 display section
15a cover
16 housing
17 support post
18 support base
101 eye guidance unit
102 indicator
103 driving device
20 control device
30 authentication device
31 biometric database

What is claimed is:

1. An imaging device comprising:
a visible light camera that captures an image of a face of a person to be authenticated;
a plurality of infrared light cameras that are aligned at different heights in a vertical direction on a housing along with the visible light camera, and configured to capture an image of eyes of the person to be authenticated, the image including an iris image;
an optical filter provided on the housing so as to cover a light receiving surface of each of the plurality of infrared light cameras and not to cover a light receiving surface of the visible light camera, the optical filter having a pass band in an infrared region and a blocking band in a visible region;
a processor; and
a memory storing instructions executable by the processor to:
select, from the plurality of infrared light cameras, an infrared light camera for capturing the image of the eyes of the person to be authenticated;
determine a region of interest to be included in the image of the eyes to be captured by the selected infrared light camera based on a distance between both of the eyes and based on an predetermined eye size; and
control a capturing process of the selected infrared light camera such that an iris of the person is included in the region of interest of the image of the eyes captured by the selected infrared light camera.

2. The imaging device according to claim 1, wherein the optical filter has a mirror surface that reflects light in the visible region.

3. The imaging device according to claim 1, wherein the light receiving surfaces of each of the plurality of infrared light cameras is covered with the optical filter.

4. The imaging device according to claim 1, further comprising a half mirror that is provided so as to cover the light receiving surface of the visible light camera.

5. The imaging device according to claim 4, wherein the half mirror reflects a part of light in the visible region incident from the person to be authenticated and transmits another part of the light to the visible light camera.

6. The imaging device according to claim 1, wherein the plurality of infrared light cameras simultaneously capture an image of the eyes of the person to be authenticated, including the iris.

7. The imaging device according to claim 1, further comprising a display device that displays information with respect to iris authentication.

8. The imaging device according to claim 1, further comprising an indicator that indicates an operation status of a device.

9. The imaging device according to claim 1, wherein the plurality of infrared light cameras are further arranged side by side in the vertical direction.

10. The imaging device according to claim 9, wherein the plurality of infrared light cameras are arranged at a constant distance.

11. The imaging device according to claim 9, further comprising an eye guidance light that guides a line of sight of the person to be authenticated toward a height of the selected infrared light camera.

12. The imaging device according to claim 9, wherein the visible light camera is arranged below the plurality of infrared light cameras aligned in the vertical direction.

13. The imaging device according to claim 9, wherein the visible light camera is arranged to a side of the plurality of infrared light cameras aligned in the vertical direction.

14. An iris authentication system comprising:
the imaging device according to claim 1; and
an authentication device that performs iris authentication of the person to be authenticated based on the iris image captured by the infrared light camera.

15. The iris authentication system according to claim 14, wherein the infrared light camera corresponding to a height of the eyes of the person to be authenticated is selected for capturing the image of the eyes of the person to be authenticated.

16. The iris authentication system according to claim 15, wherein the authentication device performs the iris authentication based on the iris image captured by the selected infrared light camera corresponding to the height of the eyes of the person to be authenticated, out of the iris image captured by each of the plurality of infrared light cameras.

17. The iris authentication system according to claim 14, further comprising a driving device that drives the housing in a vertical direction,
   wherein the instructions are executable by the processor to further control driving of the driving device based on a height position of the eyes of the person to be authenticated.

18. The iris authentication system according to claim 15, wherein the authentication device performs face authentication of the person to be authenticated based on the image of the face of the person and authenticates the person to be authenticated based on results of the face authentication and the iris authentication.

* * * * *